United States Patent [19]

Fuller

[11] B 3,998,925
[45] Dec. 21, 1976

[54] PRODUCTION OF AMMONIUM DIURANATE

[75] Inventor: Robert R. Fuller, Columbia, S.C.

[73] Assignee: Westinghouse Electric Corporation, Pittsburgh, Pa.

[22] Filed: June 22, 1973

[21] Appl. No.: 372,722

[44] Published under the second Trial Voluntary Protest Program on March 9, 1976 as document No. B 372,722.

[52] U.S. Cl. .............................. 423/15; 423/253; 423/261
[51] Int. Cl.² ...................................... C01G 43/00
[58] Field of Search .................. 423/15, 253, 261

[56] References Cited

UNITED STATES PATENTS

| | | | |
|---|---|---|---|
| 2,466,118 | 4/1949 | Miller et al. | 423/15 |
| 3,000,698 | 9/1961 | Crowe | 423/15 |
| 3,272,602 | 9/1966 | Suehiro et al. | 423/252 |
| 3,394,997 | 7/1968 | Hollander | 423/15 |
| 3,579,311 | 5/1971 | McCoy | 423/261 |
| 3,726,650 | 4/1973 | Welty | 423/15 |
| 3,758,664 | 9/1973 | Gerrald | 423/15 |

Primary Examiner—Benjamin R. Padgett
Assistant Examiner—R. E. Schafer
Attorney, Agent, or Firm—F. E. Blake

[57] ABSTRACT

Process and apparatus for producing ammonium diuranate (ADU) from uranium hexafluoride ($UF_6$) wherein gaseous $UF_6$ is first hydrolyzed, then partially neutralized with aqueous ammonium hydroxide to a pH of from 5 to 6, the resultant solution is conveyed to a precipitation vessel wherein it is admixed with additional aqueous ammonium hydroxide to a pH of from 9.8 to 10.2 whereby ADU solids precipitate, the resultant suspension is substantially continually withdrawn from the precipitation vessel and a stream of the suspension is forcefully injected back into the side of the vessel at the liquid surface at an angle to the horizontal liquid surface in the precipitation vessel to cause intense agitation and circulation or tumbling of the suspension in said vessel, the volume of the suspension being so withdrawn and circulated constituting a turnover of the total suspension volume in the vessel in the order of about a minute or less, whereby fine ADU crystals with closely consistent properties are produced, so that digestion tanks and storage vessels previously necessary in the ADU process are eliminated. A small portion of the slurry suspension from the precipitation vessel in continually withdrawn and centrifuged to provide an ADU solids stream of consistently and controllably uniform properties such that when fed to a calcining kiln it produces $UO_2$ powder of highly uniform characteristics rendering it suitable for producing $UO_2$ fuel pellets of about 95% of theoretical density, without milling the $UO_2$ to a finer particle size.

4 Claims, 2 Drawing Figures

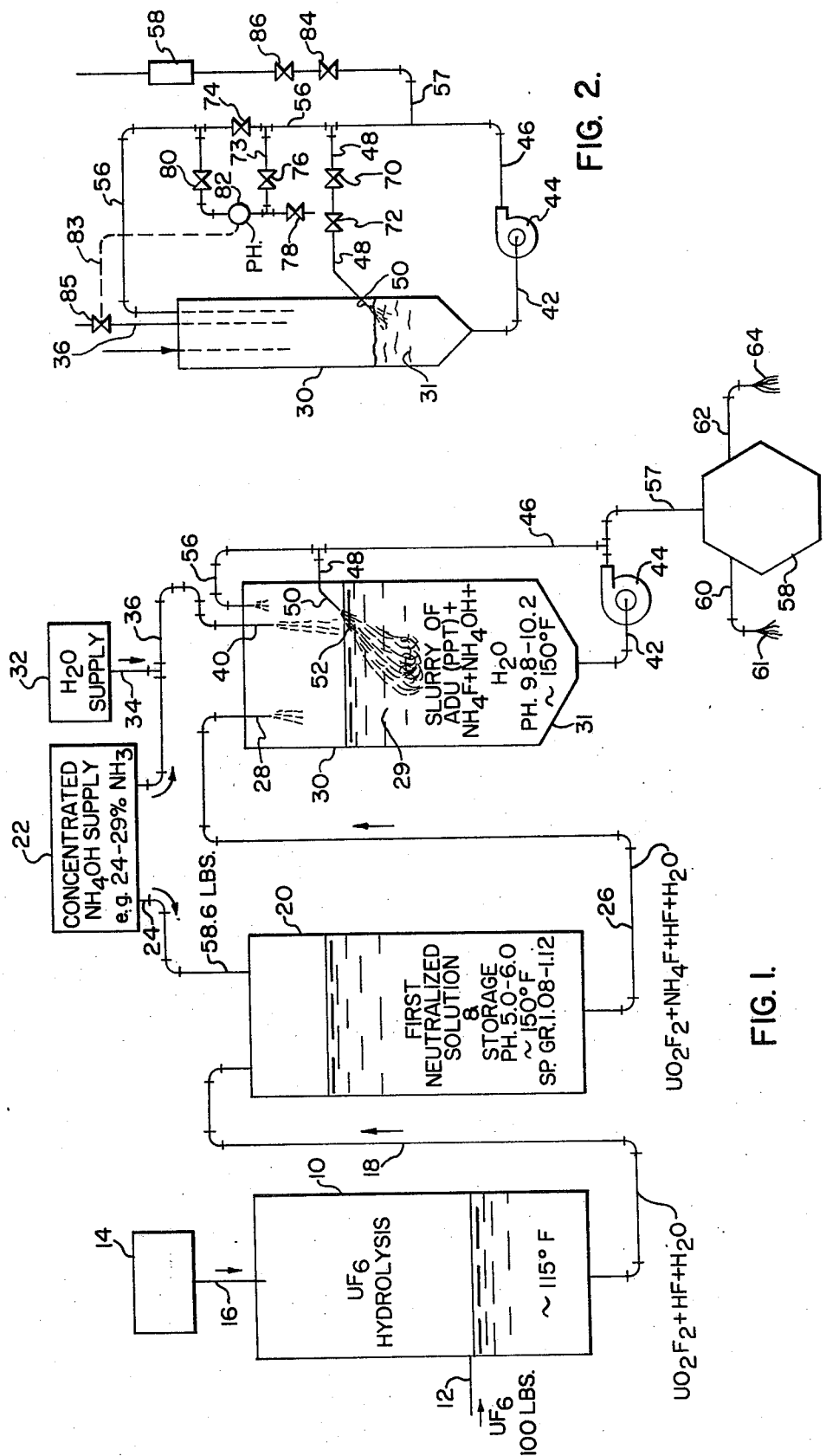

PRODUCTION OF AMMONIUM DIURANATE

BACKGROUND OF THE INVENTION

1. Field of the Invention

This process and apparatus relate to the conversion of uranium hexafluoride ($UF_6$) to ammonium diuranate (ADU), with the ultimate purpose of conversion of the ADU by calcination to $UO_2$ powder which can be pressed and sintered into fuel pellets for nuclear reactors.

2. Description of the Prior Art

U.S. Pat. No. 2,466,118 discloses that $UF_6$ can be dissolved in water to form uranyl fluoride solutions from which ADU can be precipitated by either a single stage or two stage treatment with ammonium hydroxide, the two stage process with an intermediate digestion stage at from 55° to 75°C being emphasized as necessary to produce an easily separable precipitate.

U.S. Pat. No. 3,272,602 teaches as critical the precipitation of ADU from an aqueous solution of uranyl salt having a concentration of 100 grams/liter or less, adding ammonia of 28% concentration or less at a rate of 200 grams of $NH_3$ per kilogram of U per minute or less, with a precipitation end point pH of from 6 to 7. At pH values of about 6, the ADU is an aggregate material, and the patentees state that this last crystalline product is provided by leading some of the ADU in solution. The specific examples are directed to a batch process, and the end point pH is 6.3 and 6.5 in these examples. No teaching relevant to a continuous process is disclosed.

DeHollander U.S. Pat. No. 3,394,997 discloses as necessary features for producing non-slimy ADU precipitates that dilute ammonia, substantially less than 2 molar, and preferably not over about 1.2, be added to uranyl fluoride solutions to produce an easily separable precipitate. Prior art use of concentrated ammonia solutions in treating $UF_6$ hydrolysis produce was alleged to produce slimy precipitates that were quite difficult to dewater and dry. The process of this patent involves the use of surge or holding tanks to retain the ADU precipitate suspension in water for up to 1½ hours to allow crystal growth to take place in order to produce a more easily filterable ADU. Large quantities of water are employed, some 5590 pounds being required for 130.4 pounds of $UF_6$ in the detailed showing.

U.S. Pat. No. 3,579,311 refers to the DeHollander patent application that resulted in U.S. Pat. No. 3,394,997 and adopts the process steps thereof for producing ADU.

In U.S. Pat. No. 3,758,664 there is disclosed a four step process for producing ADU, namely (1) a $UF_6$-water hydrolysis mixing step to produce $UO_2F_2$; (2) an initial partial neutralization of the $UF_6$ hydrolysis product with concentrated ammonium hydroxide; (3) a subsequent addition to this initial product of more concentrated ammonium hydroxide (3 to 6 molar), for instance by spraying, to a pH of 9.5 or higher, including recirculating part of the ADU suspension in water by means of a pump, and (4) digesting the ADU slurry in a holding tank for a period of up to 30 minutes, followed by dewatering the suspension to produce a flowable ADU slurry.

Welty U.S. Pat. No. 3,726,750 teaches the conversion of $UF_6$ to ADU by initially admixing a water hydrolysis solution of $UF_6$ with dilute ammonium hydroxide (1.1 to 1.25 N) to a pH of 5.5 to 6, then more dilute ammonium hydroxide (about 1 normal) is admixed as by spraying to precipitate the uranium compounds in solution as ADU, and the resulting slurry is recirculated by means of a pump. Large volumes of water are employed—over 3100 pounds for 100 pounds of $UF_6$.

As some of the above listed prior art has indicated, there are some factors, not fully identified, that result in relatively wide variations in the ADU products which affect the ceramic properties of the $UO_2$ produced therefrom upon calcining. Sometimes an ADU product will calcine into a $UO_2$ powder that when pressed into compacts and sintered under standard conditions produces fuel pellets all of uniform high density, for example 95 ± 2% of theoretical, of high strength and free from cracks, porosities or other defect, while the ADU product at other times calcined and treated identically to the former, produces fuel pellets whose densities vary widely and non-uniformly, and comprise substandard, cracked, porous and defective pellets. The problems of such prior art processes have been these uncontrollable variations in properties. The ultimate test of the properties of the ADU and the ceramic quality of the $UO_2$ produced therefrom is the making of fuel pellets under standard conditions of pressing, sintering and so on, and checking the properties of the pellets.

It has been found that certain of the $UO_2$ powder properties do correlate closely to the quality of pellets produced therefrom, as well as enabling prediction of the uniformity between pellets in a batch. The properties are:

1. Bulk density — $B\rho$ (Scott density in grams/cc.),
2. Particle size — F.S.S. (Fisher sub-sieve sizer in microns),
3. Surface area — B.E.T. (gas absorption method of Brunouer, Emmett and Teller in meters$^2$ per gram).

When the ratio of $(F.S.S.)^2/B.E.T.$ for a $UO_2$ powder is between 0.025 and 0.40 excellent pellets are produced. A desirable optimum range for the average values for a series of lots for $(F.S.S.)^2/B.E.T.$ is from 0.06 to 0.13, excluding recycled $UO_2$.

SUMMARY OF THE INVENTION

In accordance with this invention there has been produced a novel continuous process, and apparatus for practicing it, which simplifies the presently known processes for converting $UF_6$ to ADU, reduces the cost of the process, has reduced the amount of equipment to carry out the conversion, and also eliminates the previously required milling of the $UO_2$ to finer particle size to enable attaining an adequate degree of uniformity of the $UO_2$, and faulty and improper functioning of the ADU producing apparatus has been greatly reduced. The process produces ADU of such uniformly high quality that after calcining to $UO_2$ there may be produced therefrom fuel pellets of more uniform density, better quality, and adequately and closely meeting critical specifications. Previously required operations and controls are greatly reduced. Also the formerly used large volumes of liquid to handle and dispose of are reduced.

Briefly, the apparatus for producing ADU from $UF_6$ comprises only three vessels, a first hydrolysis vessel or tank wherein $UF_6$ gas is mixed with water to cause it to react to form $UO_2F_2$ and HF, the solution being strongly acidic, then the water with these reactants dissolved therein is conveyed to a second vessel where the solution is admixed with concentrated ammonium hydroxide to partially neutralize the solution to a pH of from 5.0 to 6.0, and finally the partially neutralized solution is conveyed to a precipitation vessel where it is admixed with more concentrated ammonium hydroxide to provide a solution of a pH of between 9.8 and 10.2 to cause ADU to form as a fine precipitate, the suspension of this fine precipitate being continually withdrawn at a rate of a complete turnover of the entire suspension volume of the order of a minute, from the lower portion of the precipitation vessel and reinjected as a high velocity stream at the liquid surface in the precipitation vessel at an angle of about 30° to 60° to the horizontal to cause violent agitation and complete tumbling and circulation of the ADU suspension, no digestion vessel being employed, and a small portion of the suspension of the order of 10% of the reinjected volume being withdrawn from the precipitation vessel for centrifugal separation of the ADU from the aqueous medium, to produce a pasty slurry comprising at least 35% of ADU which can be calcined to $UO_2$ of high and uniform ceramic quality.

BRIEF DESCRIPTION OF THE DRAWINGS

FIG. 1 is a flow diagram showing the apparatus employed to produce the ADU.

FIG.. 2 is a schematic vertical cross-section of the precipitation vessel and its associated controls.

DETAILED DESCRIPTION OF PREFERRED EMBODIMENT

In accordance with the present invention, uranium hexafluoride in cylinders is heated to about 80°C or higher to produce a gaseous stream which is then introduced into a hydrolysis vessel in which it dissolves and reacts with water as indicated by the following equation:

$$UF_6 + H_2O \rightarrow UO_2F_2 + 4HF \quad (1)$$

The $UF_6$ can comprise natural uranium, namely with about 0.7% U235, or enriched to any desired degree, for example 2.5% U235 or 3% U235, or even depleted uranium wherein the U235 content is 0.2% or less.

This aqueous solution of equation (1), which is quite acidic due to the hydrogen fluoride dissolved therein, is then conveyed to a second vessel where it is admixed with sufficient concentrated ammonium hydroxide, e.g. 24–29% $NH_3$, to produce a partially neutralized solution at a pH of between 5.0 and 6.0, preferably about a pH of 5.6, the reaction being as follows:

$$UO_2F_2 + 4HF + 4NH_4OH \rightarrow UO_2F_2 + 4NH_4F +$$
$$4H_2O + \text{slight amount of } HF \quad (2)$$

About 85 to 95% of the HF is neutralized at this stage.

It is critical that the solution be slightly acidic so that no ADU precipitate forms, and also that no complexing of the $UO_2F_2$ can occur inasmuch as any complexes formed at this stage will be difficult to break up and they are soluble in water, so that uranium in such complexes will be very difficult to recover. Enriched uranium is not only very expensive, but there is the problem of health hazards to be considered in disposing of the aqueous wastes in which it is present.

By using concentrated ammonium hydroxide, the amount of solution per pound of uranium in the second vessel is low. The specific gravity of the partially neutralized solution is between 1.08 and 1.12.

Thereafter the partially neutralized solution from the second vessel is conveyed to a precipitation vessel where it is rapidly and thoroughly admixed with sufficient concentrated ammonium hydroxide to provide a solution of a pH of from 9.8 to 10.2, preferably about 10.1. The reaction produces ADU, as a fine precipitate, in accordance with the following equation:

$$2UO_2F_2 + 7NH_4OH + HF \rightarrow (NH_4)_2 U_2O_7 \downarrow +$$
$$5NH_4F + 4H_2O \quad (3)$$

In this equation, it is assumed that one HF molecule is present for two $UO_2F_2$ molecules, though in fact, far less HF is present. An excess of ammonia is present.

The ammonium diuranate precipitate initially formed is a fine, non-colloidal particulate suspended in the aqueous solution. Within this relatively narrow pH range of 9.8 to 10.2, only minute traces of dissolved uranium are present. The temperature is kept at about 150°F, and since the reaction is exothermic a small quantity of cold water may be added—a good amount is one-half gallon of 75°F water per minute to a reactor handling 100 lbs. of $UF_6$ per hour.

Previously, in the art, it was necessary to convey the ADU suspension slurry to a digestor where it was held at from 40°C to 70°C for up to a half hour or longer to form larger ADU particles.

In accordance with this invention, the ADU suspension is withdrawn from the bottom of the precipitation vessel, preferably having an inverted cone bottom so that the precipitate cannot settle into corners or collect in a mass, by a pump that can turn over the entire liquid volume in a period of the order of a minute, for example a 50 gallon per minute pump for a reactor handling 100 lbs. per hour of $UF_6$. The pump outlet is a nozzle that injects most of the liquid suspension back as a stream at or near the surface of the liquid level in the precipitation vessel at an angle of from about 30° to 60° to the horizontal, the jet of liquid being discharged at a volume of the order of a gallon per second at a pressure of about 10 psi so that this jet violently stirs, agitates, tumbles and circulates the entire liquid volume in the vessel. Pressures of at least 5 psig are necessary to get good stirring, while pressures of 20 psig and higher are usable. Because of the turbulence of the body of the suspension its surface may be rough and quite wavy, so that the nozzle may be at some distance from the surface at one time and a splashing wave may flood the nozzle at another time.

Less than 10% of the pump output, namely 3 to 5 gallons per minute, is passed to a centrifugal separator where most of the water with any solute is separated while an ADU sludge containing from about 35% to 60% or more of water, the balance being ADU (about 88.6 lbs. per hour from 100 lbs. of $UF_{60}$). This separated waste liquid from the centrifuge, less than 2500 lbs. per hour from 100 lbs. of $UF_6$ converted per hour, is normally further processed to remove the small traces of uranium therein.

By reason of the velocity of the jet of liquid recirculated by the pump and its angle and position with respect to the surface of the liquid suspension in the precipitation vessel, the resulting thorough and intense agitation of the ADU suspension results in building up an ADU particle having a high surface area.

The ADU sludge from the centrifugal separator is pumped to a calcining kiln having three zones where these successive reactions take place: in a first zone the ADU sludge is heated relatively slowly so that all the water is evaporated leaving only solid ADU particles, in the second zone the ADU is subjected to progressively higher temperatures of up to 1300°F so that it thermally decomposes and evolves steam and $NH_3$ gas and leaves $UO_2$ and $U_3O_8$, and in the final zone hydrogen and steam are passed over the uranium oxides at temperatures of from 400°C to 1000°C to produce uranium dioxide. The calcining and steam also reduce the fluorine content of the uranium dioxide to low levels.

The following Example illustrates the practice of this invention.

EXAMPLE

Referring to FIG. 1 of the drawing, gaseous $UF_6$ generated, for example, by heating a cylinder of solidified $UF_6$, to about 80°C to 120°C, is passed through a line 12 at the rate of 100 lbs. per hour into a hydrolysis tank 10 where water from a supply tank 14 is simultaneously introduced via pipe 16 at the rate of about 1000 lbs. per hour, by spraying or trickling the water over an acid proof packing. The water and $UF_6$ react in accordance with equation (1), above, to produce an aqueous solution having dissolved therein $UO_2F_2$ and HF. This reaction is exothermic and generates some heat so that the water, entering at room temperature, about 25°C, is heated to from 110°F to 125°F (44° to 52°C) preferably to about 115°F (45°C).

The aqueous hydrolyzate solution from tank 10 is pumped or otherwise conveyed via pipe 18 to a vessel 20 where it is admixed with concentrated ammonium hydroxide conveyed by pipe 24 from a supply tank 22, the amount of ammonium hydroxide being just sufficient to bring the solution to a pH of between 5.0 and 6.0, preferably to a pH of 5.6, whereby the major proportion of the HF is converted to ammonium fluoride, but the ammonia added will not react with any of the $UO_2F_2$ under these pH conditions. The solution in vessel 20 will contain $UO_2F_2$, $NH_4F$ and HF. Its specific gravity will be between 1.08 and 1.12. The reaction of the added ammonium hydroxide with the HF will raise its temperature to about 150°F (65°C). About 58.6 pounds per hour of concentrated ammonium hydroxide—24% to 29% $NH_3$—is added.

The solution from vessel 20 is conveyed by pipe 26 to a precipitation vessel 30 where it streams from a head 28 and is rapidly admixed with a sufficient quantity of added concentrated ammonium hydroxide from supply tank 22 via conduit 36 and a small amount of cold water from supply 32 introduced via pipe 34 into conduit 36, to produce a solution 29 of a pH of between 9.8 and 10.2, preferably about 10.1. At this pH, the $UO_2F_2$ reacts completely and rapidly to form fine yellow crystals of ammonium diuranate $[(NH_4)_2U_2O_7]$. About a half gallon per minute of cold water is introduced by pipe 34 in a system reacting 100 lbs. of $UF_6$ per hour.

The sizes of the tank 10 and vessels 20 and 30 are related to the enrichment of the $UF_6$ being processed, inasmuch as critical mass limitations are involved. For 4% enriched uranium, the vessel 30 can safely contain up to 50 gallons of suspension solution.

It is an important feature of this invention to violently agitate and thoroughly circulate the suspension 31 comprising the ADU crystals suspended in the aqueous medium in vessel 30.

A sloping bottom 31 in vessel 30 leads to a conduit 42 to the intake of a pump 44 capable of pumping from 40 to 50 gallons per minute of the solution 29. The pump outlet is connected to a pipe 46. The overwhelming portion of the pump output, about 85–95% of the volume, entering pipe 46 goes to a pipe 48 entering the side of vessel 30 above the normal liquid level 52 in the vessel. The liquid suspension in pipe 48 enters a nozzle 50 directed at an angle of from 30° to 60° to the horizontal, and a high velocity stream or jet 52 of liquid suspension at a pressure of about 10 psig in pipe 48 is directed at this angle at or near the surface of the body of the suspension 29. This liquid stream or jet flowing at the rate of from ½ to 2 gallons or more per second, causes a thorough agitation of the suspension 29, and, because of the jet angle, a good circulation, tumbling and swirling of all of the suspension throughout vessel 30 occurs so that the ADU does not settle out. This pumping and jet stream circulation is carried out continually so that no ADU settles out and does not form a plug of solids in the end of pipe 42, which has occurred with previous intermittent pumping practice. The volume output of pump 44 is such that the volume of the precipitation tank is turned over in a period of the order of a minute or less.

By operating suitable valving and controls about 5 to 10% of the pump output in line 46, about 5 gallons per minute, enters pipe 56, and such portion of the pump output, about 3 to 5 gallons per minute, is conveyed to line 57. The suspension in line 57 is directed to a separator 58, preferably a centrifugal separator, where most of the aqueous solution is substantially completely freed from any solid uranium compounds and discharged by an outlet 60. The separator discharges the ADU solids via outlet 62 as a sludge or paste which comprises from 35% to 60% or more of water, the water having dissolved therein some $NH_4F$ and $NH_3$, balance being ADU—the latter comprising about 88.6 lbs. for each 100 lbs. of $UF_6$.

Referring to FIG. 2, there is illustrated in more detail some of the valving and controls in the output line 42 from the precipitation vessel 30, and the pump outlet line 46. Line 48 branching off pipe 46 conveys the recycle suspension to the precipitation vessel 30, and has therein valve 70 for opening and closing the line 48, and an automatic or manual pressure regulator 72, as, for example, a hand valve, is set to provide the desired pressure of about 10 psig at nozzle 50. Beyond the junction of line 48 with pipe 46, is pipe 56 to which is connected a by-pass line 73 that is effective on closing valve 74 in pipe 46, and opening valves 76 and 80, so that suspension in line 73 passes through a pH meter 82. The pH meter 82 may have a dial indicating the pH of the suspension passing therethrough at any time, though a pH chart recorder will normally be employed. The pH meter 82 preferably comprises a control means which is energized whenever the pH approaches or passes either the 9.8 or the 10.2 limit to pass current via line 83 to a valve 85 in pipe 36 to appropriately increase or decrease the flow of concentrated ammonia to vessel 30 so as to cause the pH of solution 31 to increase or decrease so as to cause the pH to stay well within the 9.8 to 10.2 range. A hand valve 78 enables samples of suspension to be withdrawn from line 73 into a sampling flask or other receptable for laboratory testing or other analysis.

Pipe 46 also has a T-branch to which line 57 is connected with an automatic throttle valve 84 therein to control the volume of suspension to be passed to centrifuge 58. A manually controlled valve 86 enables line 57 to be opened or fully closed.

To provide an indication of the improvement in the ADU produced by the present process as compared to that prepared in accordance with U.S. Pat. No. 3,758,644, fifled Dec. 29, 1971, which latter is among the best of the prior art processes in commercial use, a lengthy series of tests producing a total of some 230,000 lbs. of $UO_2$ were carried out using both types of processes. Over a period of nearly four months of commercial operations of the process set forth in U.S. Pat. No. 102,451, the daily average of the properties of the $UO_2$ produced by calcining the ADU were measured and recorded as indicated in the attached Table. The first 25 days comprised runs with no manual control, the last part was with normal control applied to the rcycle valve in line 46 thereof. The Table further covers a period of three months, during which ADU produced by the process of the present invention was calcined by an identical procedure to that used for the former process ADU.

TABLE

| I. Process of U.S. Pat. No. 3,758,664 | B$\rho$ | F.S.S. | B.E.T. | $(F.S.S.)^2/$ B.E.T. |
|---|---|---|---|---|
| 4 Months run—22 Blends | | | | |
| a. Range of variation including recycle product | 1.04–1.95 | 0.50–1.45 | 1.13    4.01 | 0.4    0.60 |
| b. Average excluding recycle product | 1.52 | 0.85 | 2.77 | (0.26 Calc. From Avgs.) |
| II. Present Process | | | | |
| (1) 3 Months run—Total for period—30 Blends | | | | |
| a. Range of variation including recycle product | 0.8–1.63 | 0.35–0.95 | 2.24    4.01 | 0.029–0.40 |
| b. Average excluding recycle product | 1.16 | 0.57 | 3.34 | (0.09 Calc. From Avgs.) |
| (2) Last 9 weeks of run of period (1)—20 Blends | | | | |
| a. Range of variation including recycle product | 0.8–1.49 | 0.35–0.83 | 2.24    4.01 | 0.029–0.24 |
| b. Average excluding recycle product | 1.09 | 0.54 | 3.54 | (0.08 Calc. From Avgs.) |

While good fuel pellets of $UO_2$ were produced from the $UO_2$ resulting from calcination of the ADU produced by the process of U.S. Pat. No. 3,758,664, the $UO_2$ required blending, more than 25% of the $UO_2$ had to be passed through a high speed, particle size reducing mill at least once, and small lots had to be milled twice to prooduce acceptable quality $UO_2$ pellets. By comparison, all of the $UO_2$ resulting from calcination of the ADU produced in accordance with this invention enabled production therefrom of fuel pellets of the highest quality and all were within specification with a density of 95%, +1%, −1½% of theoretical density. Of 30 lots of $UO_2$ powder produced by calcining the three months output of ADU by the present process, only one lot had to be milled once to assure optimum properties, while the last nine weeks output of some 20 blends required no additional milling of any kind. Consequently milling of the $UO_2$ is eliminated. The ADU produced by the process of the present invention resulted in a great reduction in the number of rejected pellets and freedom from cracks, porosities or other flaws. The uniformity of all properties of the fuel pellets was much greater than with the previous process described in U.S. Pat. No. 3,758,664.

It should be understood that the $UO_2$ from the calciner is often subjected to a rapid milling simply to break up any agglomerates into $UO_2$ particles of the size naturally produced by the calcining kiln. The high speed, particle size reducing milling of $UO_2$ that has been effectively eliminated by the present invention is a long continued ball milling in a high speed mill and is costly as well as being time consuming.

Blending of $UO_2$ powder is a common practice. This enables portions of powders resulting from calcining of ADU from runs made at different times or from different batches of $UF_6$, to be combined and the enrichment to be more uniform for fuel pellets.

The term "continuous" referring to the process for producing ADU from $UF_6$ denotes that the $UF_6$ gas is processed steadily and continually to ADU. However, this does not exclude the fact that, for example, after a tank of $UF_6$ gas has been used up or if there is no need for ADU to be produced for a day or two, the run is terminated. The processing can be restarted at any time for another prolonged continuous run.

I claim as my invention:

1. The process of continuously converting uranium hexafluoride ($UF_6$) to ammonium diuranate (ADU) which is calcinable to good ceramic quality $UO_2$, comprising the steps of
   a. dissolving the $UF_6$ in water to produce an aqueous acidic hydrolysis solution containing $UO_2F_2$ and HF,
   b. partially neutralizing the aqueous hydrolysis solution with concentrated ammonium hydroxide, from about 24 to 29% $NH_3$, to a pH of from 5.0 to 6.0,
   c. conveying the partially neutralized hydrolysis solution to a precipitation vessel where sufficient additional concentrated ammonium hydroxide is added to bring the pH to a value of from 9.8 to 10.2 to cause the $UO_2F_2$ to form ADU as a precipitate suspended in the aqueous solution with substantially all of the fluoride being converted to $NH_4F$,
   d. withdrawing the precipitate suspension from the lower portion of the precipitation vessel and injecting a stream thereof forcefully under pressure into the suspension liquid, the stream being injected in the vicinity of the liquid surface and at an angle of from about 30° to 60° to the horizontal, the withdrawal and return of the suspension being at a rate of the order of a gallon a minute to effect a complete turnover of the precipitation vessel suspension in a period of the order of a minute, the injected stream causing violent agitation and circulation of the suspension in the precipitation vessel so that ADU precipitate particles of high surface area are produced, e. a small portion of the suspension in the precipitation vessel being continuously withdrawn and the ADU particles therein are substantially dewatered to provide a sludge comprising at least about 35% ADU by weight.

2. The process of claim 1, wherein the suspension from the precipitation vessel is discharged at a pressure of from about 5 to 20 psig as a stream into the aqueous suspension in the precipitation vessel, and the volume is about a gallon per second.

3. The process of claim 1, wherein the ADU suspension in the precipitation vessel is conveyed from the bottom of the vessel to a pump at a rate to remove the entire volume of the suspension in less than a minute, and the major proportion of the pump output is returned to the precipitation vessel as a jet, while a minor porportion of the pump output of the order of 10% is conveyed to a centrifugal separator to effect dewatering of the ADU precipitate.

4. The process of continuously converting uranium hexafluoride ($UF_6$) to ammonium diuranate (ADU) which is calcinable to good ceramic quality $UO_2$, comprising the steps of a. dissolving the $UF_6$ in water to produce an aqueous acidic hydrolysis solution containing $UO_2F_2$ and HF, b. partially neutralizing the aqueous hydrolysis solution with concentrated ammonium hydroxide, from about 24 to 29% $NH_3$, to a pH of from 5.0 to 6.0, c. conveying the partially neutralized hydrolysis solution to a precipitation vessel where sufficient additional concentrated ammonium hydroxide is added to bring the pH to a value of from 9.8 to 10.2 to cause the $UO_2F_2$ to form ADU as a precipitate suspended in the aqueous solution with substantially all of the fluoride being converted to $NH_4F$, d. withdrawing the precipitate suspension from the lower portion of the precipitation vessel and injecting a stream thereof forcefully under pressure into the suspension liquid, the stream being injected in the vicinity of the liquid surface and at an angle of from 30° to 60° to the horizontal, the withdrawal and return of the suspension being at a rate to effect a complete turnover of the precipitation vessel suspension in a period of the order of a minute, the injected stream causing violent agitation and circulation of the suspension in the precipitation vessel so that ADU precipitate particles of high surface area are produced, e. a small portion of the suspension in the precipitation vessel being continuously withdrawn and the ADU particles therein are substantially dewatered to provide a sludge comprising at least about 35% ADU by weight, f. conveying the ADU sludge to a calcining kiln where the sludge is heated to drive off all the water, the ADU is decomposed to form uranium oxide, and hydrogen is passed over the uranium oxides to produce uranium dioxide having good ceramic properties, and not requiring milling to finer particles in order to produce therefrom high quality fuel pellets.

* * * * *